(12) United States Patent
Günzel et al.

(10) Patent No.: US 10,571,555 B2
(45) Date of Patent: Feb. 25, 2020

(54) METHOD FOR DETECTING A BLOCKED STATE OF AN ULTRASONIC SENSOR OF A MOTOR VEHICLE, ULTRASONIC SENSOR APPARATUS AND MOTOR VEHICLE

(71) Applicant: VALEO Schalter und Sensoren GmbH, Bietigheim-Bissingen (DE)

(72) Inventors: Thorben Günzel, Braunschweig (DE); Mario Schwarze, Vilsheim (DE); Paul-David Rostocki, Bietigheim-Bissingen (DE); Michael Hallek, Bietigheim-Bissingen (DE); Ulrich Bressler, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 180 days.

(21) Appl. No.: 15/305,541

(22) PCT Filed: Apr. 21, 2015

(86) PCT No.: PCT/EP2015/058605
§ 371 (c)(1),
(2) Date: Oct. 20, 2016

(87) PCT Pub. No.: WO2015/162132
PCT Pub. Date: Oct. 29, 2015

(65) Prior Publication Data
US 2017/0045611 A1    Feb. 16, 2017

(30) Foreign Application Priority Data

Apr. 22, 2014  (DE) .................. 10 2014 105 646

(51) Int. Cl.
*G01S 7/52* (2006.01)
*G01S 7/527* (2006.01)
(Continued)

(52) U.S. Cl.
CPC .......... *G01S 7/527* (2013.01); *G01S 7/52004* (2013.01); *G01S 15/025* (2013.01); *G01S 15/876* (2013.01);
(Continued)

(58) Field of Classification Search
None
See application file for complete search history.

(56) References Cited

U.S. PATENT DOCUMENTS 5,313,189 A * 5/1994 Dodd .................. B60Q 9/008
340/433
2002/0023498 A1* 2/2002 Tsuzuki ................ G01N 29/12
73/617
(Continued)

FOREIGN PATENT DOCUMENTS

DE    34 20 004 A1    12/1985
DE     10247971 A1     5/2004
(Continued)

OTHER PUBLICATIONS

International Search Report issued in PCT/EP2015/058605, dated Jul. 15, 2015 (3 pages).
(Continued)

*Primary Examiner* — Hovhannes Baghdasaryan
(74) *Attorney, Agent, or Firm* — Osha Liang LLP

(57) ABSTRACT

The invention relates to a method for detecting a blocked state of an ultrasonic sensor (3) of a motor vehicle (1), in which at least one oscillation parameter of the ultrasonic sensor (3) is recorded and an evaluation device (4) of the motor vehicle (1) carries out a detection algorithm which is used to evaluate the at least one oscillation parameter for the purpose of detecting the blocked state. An object (9) in an area surrounding the motor vehicle (1) is detected by the evaluation device (4) on the basis of sensor data from at least
(Continued)

Figure 1:
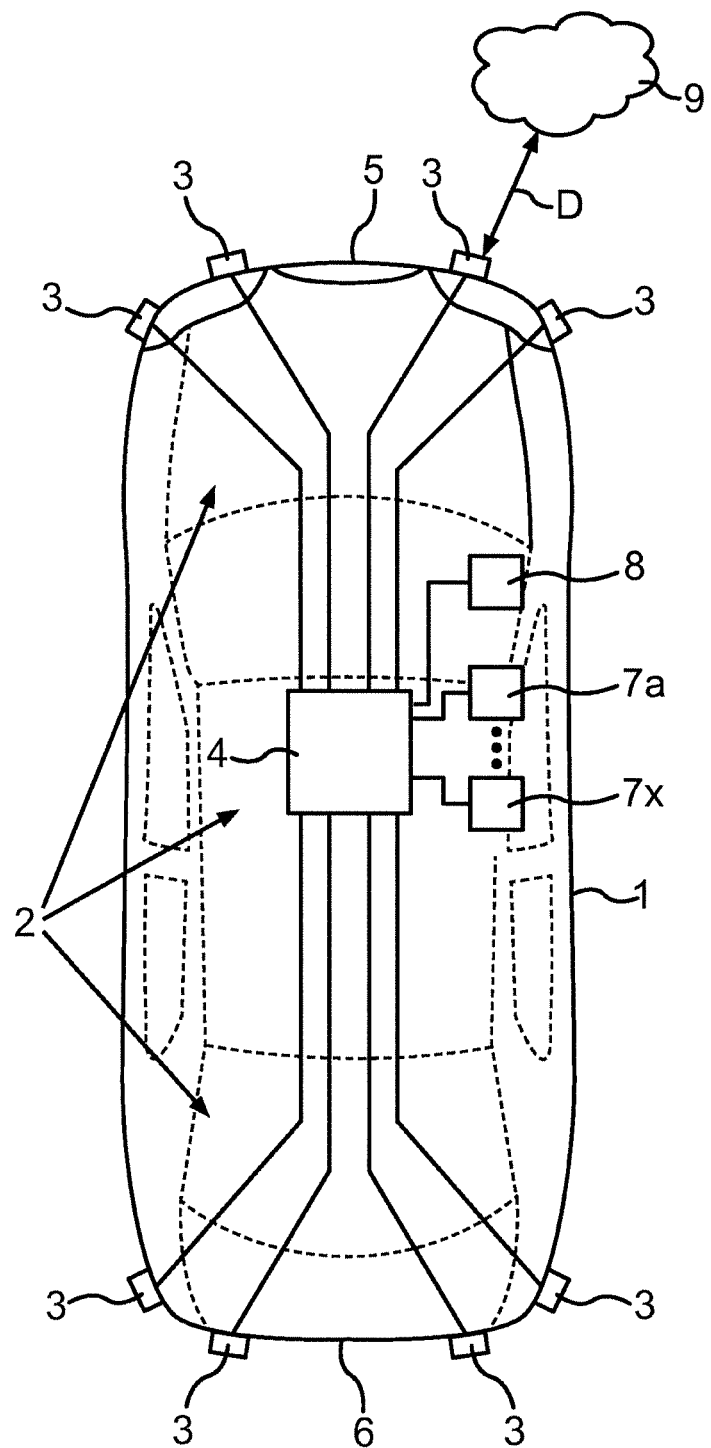

one sensor (3, 8) of the motor vehicle (1), in which case, when a distance (D) between the object (9) and the ultrasonic sensor (3) falls below a predefined threshold value (G), the detection algorithm is not carried out by the evaluation device (4) or a blocked state of the ultrasonic sensor (3), as detected using the detection algorithm, is ignored by the evaluation device (4).

9 Claims, 2 Drawing Sheets

(51) Int. Cl.
*G01S 15/931* (2020.01)
*G01S 15/87* (2006.01)
*G01S 15/02* (2006.01)

(52) U.S. Cl.
CPC ... *G01S 15/931* (2013.01); *G01S 2007/52009* (2013.01); *G01S 2015/932* (2013.01); *G01S 2015/938* (2013.01)

(56) References Cited

U.S. PATENT DOCUMENTS

2010/0067324 A1* 3/2010 Preissler ............. G01S 7/52004
    367/13
2011/0241858 A1* 10/2011 Tsuzuki ............. G01S 7/52004
    340/435
2011/0242941 A1* 10/2011 Tsuzuki .................. G01S 7/521
    367/118
2016/0214604 A1* 7/2016 Kida ..................... B60W 50/10
2016/0291153 A1* 10/2016 Mossau ................. G01S 15/931

FOREIGN PATENT DOCUMENTS

| DE | 102009040992 A1 | 3/2011 |
| DE | 102010021960 A1 | 12/2011 |
| DE | 10 2012 014199 A1 | 2/2014 |
| DE | 10 2012 220 311 A1 | 5/2014 |
| DE | 10 2013 223240 B3 | 10/2014 |
| DE | 10 2013 211419 A1 | 12/2014 |

OTHER PUBLICATIONS

Written Opinion of the International Searching Authority issued in PCT/EP2015/058605, dated Jul. 15, 2015 (5 pages).
German Search Report issued in DE 10 2014 105 646.9 dated Aug. 29, 2014 (10 pages).

* cited by examiner

METHOD FOR DETECTING A BLOCKED STATE OF AN ULTRASONIC SENSOR OF A MOTOR VEHICLE, ULTRASONIC SENSOR APPARATUS AND MOTOR VEHICLE

The invention relates to a method for detecting a blocked state of an ultrasonic sensor of a motor vehicle, in which at least one oscillation parameter of the ultrasonic sensor is recorded and an evaluation device of the motor vehicle carries out a detection algorithm which is used to evaluate the at least one oscillation parameter for the purpose of detecting the blocked state. The invention also relates to an ultrasonic sensor apparatus which is designed to carry out such a method and to a motor vehicle having such an ultrasonic sensor apparatus.

Methods for detecting a blocked state of an ultrasonic sensor are already known from the prior art. This is the detection of a situation in which the ultrasonic sensor is covered by an additional mass, for instance by dirt and/or snow and/or ice. Since ultrasonic sensors are nowadays also being used more and more frequently outside the actual parking assist functionality, for example for driving assistance with active braking interventions on account of a detected risk of collision, it is intended to be ensured, during operation of the motor vehicle, that the ultrasonic sensors present on the motor vehicle can reliably detect the obstacles in the area surrounding the motor vehicle and can also reliably record the distances up to a predetermined range. If the ultrasonic sensors are covered with an additional mass, this is intended to be reliably detected. The known methods for detecting ice or dirt are fundamentally based on evaluating side effects which are caused by the additional mass on the ultrasonic sensor. The so-called decay time of the diaphragm of the ultrasonic sensor, for example, is thus influenced by an additional mass or a virtual echo by accordingly evaluating the electrical reception signal of the ultrasonic sensor. However, in the worst-case scenario, it may also be the case that the additional mass neither results in a change in the decay time of the diaphragm nor causes additional echoes. In such situations, the blocked state of the ultrasonic sensor cannot be detected and the sensor is no longer able to detect a real object and to reliably record the distances.

In order to be able to detect the blocked state of the ultrasonic sensor in such unfavourable situations as well, the prior art has already proposed a method in which a plausibility check is carried out to the effect that the ultrasonic sensor is switched to a checking mode in which the sensitivity of the ultrasonic sensor is increased considerably in comparison with normal operation. In this checking mode, a check is carried out in order to determine whether the ultrasonic sensor can receive so-called ground reflections or reflections at other objects which are usually hidden during normal operation on account of the lower sensitivity. However, the disadvantage of such a checking mode is that the ultrasonic sensor is not available for the actual measurements for a particular period of time, thus resulting in a time delay of the availability of the sensor.

An alternative method, as described in the document DE 102 47 971 A1, provides a certain level of improvement here. In this case, the natural frequency or resonant frequency of the ultrasonic sensor is measured and is compared with stored reference values. This method is based on the fact that the resonant frequency of the ultrasonic sensor is a direct indicator of soiling, a layer of ice or snow, since this additional layer influences the mass of the harmonic oscillation. This is because the oscillating mass and consequently also the resonant frequency of the sensor also change with the additional mass of the soiling or the layer of ice or snow.

In order to be able to detect a state of an ultrasonic sensor which is covered with dirt and/or ice and/or snow, DE 10 2009 040 992 A1 proposes the practice of recording the decay frequency of the ultrasonic sensor following excitation of the diaphragm and comparing it with the excitation frequency. It is determined whether or not the ultrasonic sensor is blocked on the basis of the result of this comparison.

DE 10 2010 021 960 A1 also describes a method in which, in order to detect the blocked state of an ultrasonic sensor, the decay time of the diaphragm is evaluated over a plurality of measurement cycles of the ultrasonic sensor. A further plausibility check may here be the fact that the blocked state is detected only provided that a temperature of the area surrounding the motor vehicle is below a predefined limit value. This limit value may be 0° C., for example. It is therefore possible to reduce the error rate when detecting the blocked state.

Although the blocked state of an ultrasonic sensor can be fundamentally reliably detected by evaluating an oscillation parameter, for example by evaluating the resonant frequency and/or the decay time, since the oscillation parameters are a reliable measure of an additional mass on the diaphragm of the ultrasonic sensor, the evaluation of the oscillation parameters—such as the decay time in particular—may result only in inadequate results in some situations in the prior art since, in addition to an additional mass, there are also other factors which influence the oscillation parameters and, in particular, the decay time. Thus, the measurement of the current decay time of an ultrasonic sensor is negatively influenced when an object is very close to the ultrasonic sensor and therefore produces an echo which is also received by the ultrasonic sensor within the decay time and is therefore included in the decay time. The determination of the blindness of the ultrasonic sensor by evaluating the decay time is then not possible or is possible only to a limited extent.

The object of the invention is to show a solution for how errors can be avoided when detecting the blocked state in a method of the generic type mentioned at the outset.

This object is achieved, according to the invention, by means of a method, an ultrasonic sensor apparatus and a motor vehicle having the features according to the respective independent patent claims. The dependent patent claims, the description and the figures relate to advantageous embodiments of the invention.

A method according to the invention is used to detect a blocked state of an ultrasonic sensor of a motor vehicle. In this case, a blocked state is understood as meaning a state covered by an additional mass, such as in particular a state of the ultrasonic sensor covered by ice and/or snow and/or dirt, in which the additional mass adheres to the diaphragm of the ultrasonic sensor as a coating. At least one oscillation parameter of the ultrasonic sensor is recorded, for example a decay time and/or a resonant frequency and/or an oscillation amplitude. An electronic evaluation device of the motor vehicle carries out a detection algorithm which is used to evaluate the at least one oscillation parameter for the purpose of detecting the blocked state. For example, within the scope of the detection algorithm, a current actual value of the at least one oscillation parameter can be compared with at least one limit value, with the result that, on the basis of this comparison, a check is carried out in order to determine whether or not the ultrasonic sensor is blocked. An object in an area surrounding the motor vehicle is detected by the evaluation device on the basis of sensor data from at least one sensor of the motor vehicle. If the evaluation device then detects that a distance between the object and the ultrasonic sensor falls below a predetermined threshold value, the detection algorithm is not carried out or a blocked state of the ultrasonic sensor, as detected using the detection algorithm, is ignored by the evaluation device.

Therefore, the invention provides that, when an object or obstacle outside the vehicle very close to the ultrasonic sensor is detected, a non-blocked state of the ultrasonic sensor is always assumed. On the one hand, this is enabled by the fact that the detection algorithm is not carried out at all after the new object has been detected. On the other hand, this can also be implemented in such a manner that, after the new object has been detected, the positive detection of the blocked state is ignored and the ultrasonic sensor is nevertheless classified as non-blocked. Such a procedure makes it possible to prevent errors when detecting the blocked state and to minimize the false detection rate. This is because, if an object is very close to the ultrasonic sensor, this results in the ultrasonic waves (target echo) reflected by the object also being received by the ultrasonic sensor during the so-called decay time of the diaphragm and therefore influencing the measurement of the decay time. In the prior art, this influence results in a blocked state of the ultrasonic sensor being incorrectly detected and displayed even though the ultrasonic sensor is actually "clean" and is therefore fully functional. Such false detections are now prevented by virtue of the fact that a non-blocked state of the ultrasonic sensor is always assumed after a new object has been detected.

The ultrasonic sensor may be, on the one hand, a sensor whose diaphragm is arranged in a continuous recess in a cladding part, for example a bumper, of the motor vehicle and is therefore visible from outside the motor vehicle. On the other hand, provision may alternatively also be made for the ultrasonic sensor to be arranged on a rear side of the cladding part in such a manner that the diaphragm rests against the rear side of the cladding part and emits and receives the ultrasonic signals through the material of the cladding part. Particularly in the case of such a concealed arrangement of the ultrasonic sensor on the cladding part, which is invisible from the outside, the change in the oscillation parameters or the oscillation properties of the ultrasonic sensor on account of the temperature dependence of the material stiffness is particularly significant.

The evaluation device is preferably a central control device which is used to control a plurality of ultrasonic sensors of the motor vehicle. This control device can be used, for example, to control a group of ultrasonic sensors arranged on a bumper. However, it may also be a control device which is common to all ultrasonic sensors arranged on the front and rear bumpers.

With regard to the threshold value for the distance of the object, provision may be made for this threshold value to correspond to a signal propagation time of ultrasonic waves which is greater than or equal to a normal value or nominal value of a decay time of the ultrasonic sensor which is established when an ultrasonic sensor is not blocked. This has the advantage that the object is classified as a nearby object even before its target echo is included in the decay time of the ultrasonic sensor and distorts the measurement of the decay time. The actual current decay time of the ultrasonic sensor can therefore be measured precisely without this measurement being distorted by the target echo of the nearby object. If the distance of the object falls below the threshold value, with the result that the target echo of the object is at least partially received within the decay time, the detection algorithm is not carried out or the detection of the blocked state is ignored. The false detection rate is therefore minimal.

If the blocked state is detected by the evaluation device, the evaluation device can output a corresponding warning signal which is used to visually and/or acoustically and/or haptically alert the driver to the blocked state and therefore to the need to clean the ultrasonic sensor. However, if it is detected that the distance between the object and the ultrasonic sensor falls below the threshold value, the evaluation device can ignore the detection of the blocked state. This means, in particular, that the evaluation device does not output the warning signal. As a result, the driver is not unnecessarily disturbed by the output of a warning signal.

One embodiment may provide for the object to be tracked by the evaluation device over time on the basis of the sensor data. This means, in particular, that a position of the object relative to the ultrasonic sensor is continuously determined by the evaluation device on the basis of the sensor data. In other words, a digital map of the area surrounding the motor vehicle is provided in the evaluation device and the position of the object is entered in this digital map of the surrounding area. The relative position of the object is therefore always known in the evaluation device, with the result that the evaluation device can determine particularly precisely when the object enters the vicinity of the ultrasonic sensor and the distance of the object falls below the threshold value.

Quite generally, provision may be made for the sensor data, on the basis of which the object is detected and, in particular, is also tracked, to be provided by the ultrasonic sensor itself and/or by at least one environmental sensor of the motor vehicle which is separate from the ultrasonic sensor.

One embodiment may therefore provide for the sensor data to be provided by the ultrasonic sensor itself. Tracking the object on the basis of the sensor data from the ultrasonic sensor can then involve extrapolating the relative position of the object and/or determining it on the basis of sensor data from at least one environmental sensor of the motor vehicle which is separate from the ultrasonic sensor after the object enters a blind area of the ultrasonic sensor. In this case, the blind area preferably corresponds to a distance from the ultrasonic sensor corresponding to the decay time (normal value of the decay time) of the ultrasonic sensor. In this manner, the relative position of the object is still known in the evaluation device, with the result that the evaluation device can also detect that the distance between the object and the ultrasonic sensor exceeds the threshold value again and the detection algorithm can be carried out again and the detection of the blocked state can no longer be ignored.

As already stated, the sensor data can additionally or alternatively be provided by at least one environmental sensor of the motor vehicle which is separate from the ultrasonic sensor. For example, a radar sensor and/or a lidar sensor and/or a camera and/or another ultrasonic sensor can be used in this case. This has the advantage that the current position of the object relative to the ultrasonic sensor and relative to the motor vehicle can also be determined very precisely when the object is in said blind area of the ultrasonic sensor.

As already stated, a resonant frequency and/or a decay time and/or an oscillation amplitude of the diaphragm of the ultrasonic sensor can be evaluated as oscillation parameters for the purpose of detecting the blocked state of the ultrasonic sensor. The resonant frequency is the natural frequency of the diaphragm which varies on the basis of the actual oscillation mass and is measured immediately after the diaphragm has been excited, that is to say during decay of the diaphragm. The resonant frequency is therefore a decay frequency. In contrast, the decay time denotes a period for which the diaphragm is still oscillating after termination of the excitation by a corresponding piezoelectric element.

The invention also relates to an ultrasonic sensor apparatus for a motor vehicle, having at least one ultrasonic sensor and having an evaluation device, which is designed to carry out a method according to the invention.

A motor vehicle according to the invention, in particular a passenger car, comprises an ultrasonic sensor apparatus according to the invention.

The preferred embodiments and their advantages presented with respect to the method according to the invention accordingly apply to the ultrasonic sensor apparatus according to the invention and to the motor vehicle according to the invention.

Further features of the invention emerge from the claims, the figures and the description of the figures. All of the features and feature combinations mentioned above in the description and the features and feature combinations mentioned below in the description of the figures and/or shown in the figures alone can be used not only in the respectively stated combination, but also in other combinations or else alone.

Figure 2:
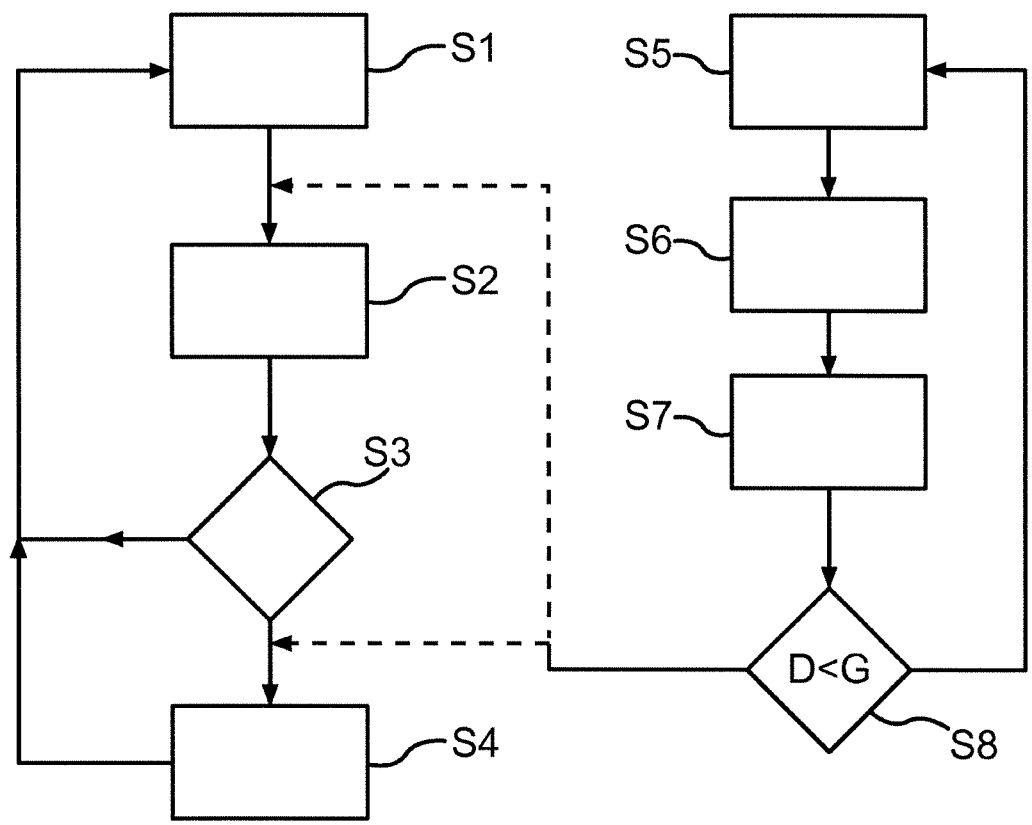

The invention is explained in more detail below using a preferred exemplary embodiment and with reference to the accompanying drawings, in which:

FIG. 1 shows a schematic illustration of a motor vehicle having an ultrasonic sensor apparatus according to one embodiment of the invention; and FIG. 2 shows a flowchart of a method according to one embodiment of the invention.

A motor vehicle 1 illustrated in FIG. 1 is a passenger car, for example. The motor vehicle 1 comprises an ultrasonic sensor apparatus 2 having a multiplicity of ultrasonic sensors 3 and an electronic evaluation device 4, for example in the form of a control device. The number and arrangement of ultrasonic sensors 3 are illustrated only by way of example in FIG. 1 and can vary according to the embodiment. In the exemplary embodiment, a multiplicity of ultrasonic sensors 3 are arranged on a front bumper 5 of the motor vehicle 1; a multiplicity of ultrasonic sensors 3 are also arranged on a rear bumper 6 of the motor vehicle 1. Two alternative embodiments can be provided with regard to the type of installation of the ultrasonic sensors 3. On the one hand, the ultrasonic sensors 3 may each be arranged in a recess in the respective bumper 5, 6, with the result that the diaphragms of the respective ultrasonic sensors 3 are arranged inside the respective continuous recess in the bumper 5, 6. On the other hand, however, concealed installation of the ultrasonic sensors 3 behind the respective bumper 5, 6 may also be provided, with the result that the diaphragms of the ultrasonic sensors 3 rest against the rear side of the respective bumper 5, 6 and emit and receive the ultrasonic signals through the material of the bumper 5, 6.

The ultrasonic sensors 3 are each designed to record distances to obstacles in an area surrounding the motor vehicle 1. The respectively measured distance values are transmitted from the ultrasonic sensors 3 to the central evaluation device 4 which processes the measured values from the ultrasonic sensors 3. A plurality of driver assistance systems 7a to 7x may be provided in the motor vehicle 1, which driver assistance systems are designed to provide different functionalities in the motor vehicle 1, to be precise using the measured distances of the ultrasonic sensors 3. FIG. 1 shows the different driver assistance systems 7a to 7x as separate components; however, a plurality of functionalities may also be provided by a common control device which then undertakes the function of a plurality of driver assistance systems. The following systems, for example, may be provided as driver assistance systems 7a to 7x: a parking assist system in which the measured distances are acoustically and/or optically output, an automatic parking assistance system for automatic parking, an automatic brake assist system which is used to autonomously brake the motor vehicle 1 on account of a risk of a collision detected on the basis of the measured values from the ultrasonic sensors 3, a system for blind spot monitoring, a spacing system, a collision detection system and the like.

For each ultrasonic sensor 3, the evaluation device 4 can separately check whether this ultrasonic sensor 3 is covered by an additional mass, such as soiling and/or ice and/or snow, and is therefore blocked in terms of its functionality. For this purpose, the current actual value of at least one oscillation parameter is recorded for each ultrasonic sensor 3, said value describing the acoustic behaviour of the respective ultrasonic sensor 3. The actual value of the at least one oscillation parameter is transmitted from the respective ultrasonic sensor 3 to the evaluation device 4, with the result that the latter records the current actual value of the at least one oscillation parameter. In this case, the respective resonant frequency and/or the respective decay time, for example, can be recorded as oscillation parameters. A detection algorithm is then preferably continuously carried out in the evaluation device 4 for each ultrasonic sensor 3, during which algorithm the respective current actual value of the at least one oscillation parameter is compared with a stored limit value. In this case, such a limit value can have both an upper definition and a lower definition. If the evaluation device 4 detects that the actual value of the oscillation parameter passes (exceeds or falls below) the associated limit value, the evaluation device 4 can interpret this to the effect that the ultrasonic sensor 3 is blocked, in terms of its functionality, by an additional mass. In this case, the evaluation device 4 can generate a corresponding warning signal which is used to alert the driver to the need to clean the ultrasonic sensors 3.

In addition, the evaluation device 3 may be optionally coupled to at least one environmental sensor 8 which is different from the ultrasonic sensors 3, for example a radar sensor and/or a lidar sensor and/or a camera. This environmental sensor 8 then also provides sensor data relating to the area surrounding the motor vehicle and transmits these sensor data to the evaluation device 4.

A method according to one embodiment of the invention is explained in more detail below with reference to FIG. 2: according to step S1, the evaluation device 4 records the above-mentioned at least one oscillation parameter of the respective ultrasonic sensor 3, for example the decay time and/or the resonant frequency. In a further step S2, the detection algorithm is carried out, during which algorithm the at least one oscillation parameter is evaluated and is compared in this case with the at least one limit value. On the basis of this comparison, a check is then carried out according to step S3 in order to determine whether or not the ultrasonic sensor 3 is blocked. If this is not the case, the method returns to step S1. If the ultrasonic sensor 3 is blocked, a warning signal is output according to step S4 and signals the need to clean the ultrasonic sensors 3. This warning signal can be optically or visually and/or acoustically and/or haptically output.

In a parallel manner or at the same time, the evaluation device 4 receives sensor data from the ultrasonic sensors 3 and/or sensor data from the at least one separate environmental sensor 8 according to step S5. According to step S6, the evaluation device 4 then detects an object 9 outside the vehicle (compare FIG. 1) on the basis of the sensor data. In this case, the object 9 is tracked over time, which means that its position relative to the motor vehicle 1 and to the ultrasonic sensors 3 is continuously recorded. In other words, a digital map of the area surrounding the motor vehicle 1 is provided in the evaluation device 4, and the position of the object 9 is entered in this digital map of the surrounding area. The current position of the object 9 is determined in this case in step S7.

With regard to the tracking of the object 9, different embodiments may now be provided: on the one hand, it is possible to use the sensor data from the ultrasonic sensors 3 which can be provided both by so-called cross-measurements (indirect measurements) and by direct measurements. In the case of cross-measurements, a first ultrasonic sensor 3 emits the ultrasonic waves, while another ultrasonic sensor 3 is operated as a receiving sensor which receives the target echoes. In contrast, in the case of direct measurements, the same ultrasonic sensor 3 is operated both as a transmitting sensor and as a receiving sensor, with the result that this ultrasonic sensor 3 both emits the ultrasonic waves and receives the target echoes. As a result of cross-measurements in particular, it is possible to precisely record the relative position of the object 9. Additionally or alternatively, the sensor data from the at least one environmental sensor 8 may also be used to determine the relative position of the object 9. They can optionally also be combined with the sensor data from the ultrasonic sensors 3.

According to step S8, the evaluation device 4 checks whether a current distance D from an ultrasonic sensor 3 falls below a predefined limit value G. In this case, this threshold value G corresponds to a signal propagation time of ultrasonic waves which is greater than or equal to a normal value of the decay time of the ultrasonic sensor 3, that is to say a decay time which is established when the ultrasonic sensor 3 is not blocked. The threshold value G for the distance D can therefore correspond, in particular, to a blind area of the ultrasonic sensor 3 in which no detection is possible since the target echoes are also received during the decay time.

If, according to step S8, it is detected that the distance D is greater than the threshold value G, the method returns to step S5 again. If it is detected that the threshold value G is undershot, two alternative procedures are possible: on the one hand, the evaluation device 4 can ignore the detection of a blocked state according to step S3 and can prevent the output of the warning signal. On the other hand, the performance of the detection algorithm according to step S2 can be briefly interrupted. These measures are taken only until the distance D of the object 9 exceeds the predefined threshold value G again.

If the distance D is less than the threshold value G and the object 9 is therefore in the blind area of the ultrasonic sensor 3, the object 9 can be tracked with the aid of an extrapolation and/or on the basis of sensor data from the other ultrasonic sensors 3 and/or from the at least one environmental sensor 8. The position of the object 9 relative to the ultrasonic sensor 3 is therefore also known when the object 9 is in the blind area of the ultrasonic sensor 3.

The invention claimed is:

1. A method for detecting a blocked state of an ultrasonic sensor of a motor vehicle, comprising:
   recording at least one oscillation parameter comprising a decay time of the ultrasonic sensor;
   carrying out, by an evaluation device of the motor vehicle, a detection algorithm that evaluates the at least one oscillation parameter to detect the blocked state;
   detecting an object in an area surrounding the motor vehicle by the evaluation device on the basis of sensor data from at least one sensor of the motor vehicle;
   detecting, using the detection algorithm, the blocked state of the ultrasonic sensor; and
   ignoring, by the evaluation device, the blocked state of the ultrasonic sensor, provided a distance between the object and the ultrasonic sensor falls below a predefined threshold value,
   wherein the predefined threshold value for the distance corresponds to a signal propagation time of ultrasonic waves which is greater than or equal to the decay time measured when the ultrasonic sensor is not in the blocked state,
   wherein the blocked state is a state wherein the ultrasonic sensor is covered by additional mass, and
   wherein ignoring the detection of the blocked state means that a warning signal is omitted by the evaluation device.

2. The method according to claim 1, wherein the object is tracked over time on the basis of the sensor data, with the result that, a position of the object relative to the ultrasonic sensor is continuously determined by the evaluation device on the basis of the sensor data.

3. The method according to claim 2, wherein the sensor data are provided by the ultrasonic sensor.

4. The method according to claim 3, wherein tracking the object on the basis of the sensor data from the ultrasonic sensor involves extrapolating at least one from a group consisting of the relative position of the object and determining it on the basis of sensor data from at least one environmental sensor of the motor vehicle which is separate from the ultrasonic sensor after the object enters a blind area of the ultrasonic sensor.

5. The method according to claim 1, wherein the sensor data are provided by at least one environmental sensor of the motor vehicle which is separate from the ultrasonic sensor, wherein the at least one environmental sensor is one selected from the group consisting of a radar sensor, a lidar sensor, a camera, and a separate ultrasonic sensor.

6. The method according to claim 1, wherein the at least one oscillation parameter further comprises at least one from a group consisting of a resonant frequency and an oscillation amplitude.

7. An ultrasonic sensor apparatus for a motor vehicle, comprising:
   at least one ultrasonic sensor; and
   an evaluation device that records at least one oscillation parameter comprising a decay time of the ultrasonic sensor and that carries out a detection algorithm to detect a blocked state of the ultrasonic sensor by evaluating the at least one oscillation parameter,
   wherein the evaluation device detects an object in an area surrounding the motor vehicle on the basis of sensor data from at least one sensor of the motor vehicle,
   when a distance between the object and the ultrasonic sensor falls below a predefined threshold value, the blocked state of the ultrasonic sensor, as detected using the detection algorithm, is ignored by the evaluation device,
   wherein the threshold value for the distance corresponds to a signal propagation time of ultrasonic waves which is greater than or equal to the decay time measured when the ultrasonic sensor is not in the blocked state, wherein the blocked state is a state wherein the ultrasonic sensor is covered by additional mass, and wherein ignoring the detection of the blocked state means that a warning signal is omitted by the evaluation device.

8. A motor vehicle passenger car, having an ultrasonic sensor apparatus according to claim 7.

9. The method according to claim 6, wherein the at least one oscillation parameter comprises a resonant frequency, a decay time, and an oscillation amplitude.

\* \* \* \* \*